United States Patent
Marquart et al.

(10) Patent No.: US 8,976,243 B2
(45) Date of Patent: Mar. 10, 2015

(54) CAMERA FOR USE IN A DIGITAL NETWORK

(75) Inventors: Volker Marquart, Bavendorf (DE); Marcel Brasch, Wolfegg (DE)

(73) Assignee: Liebherr-Elektronik GmbH, Lindau (DE)

( * ) Notice: Subject to any disclaimer, the term of this patent is extended or adjusted under 35 U.S.C. 154(b) by 1487 days.

(21) Appl. No.: 12/504,252

(22) Filed: Jul. 16, 2009

(65) Prior Publication Data
US 2010/0020173 A1 Jan. 28, 2010

(30) Foreign Application Priority Data
Jul. 22, 2008 (DE) .................. 20 2008 009 834 U

(51) Int. Cl.
*H04N 9/00* (2006.01)
*H04N 7/18* (2006.01)
*G08B 13/196* (2006.01)
*H04N 5/232* (2006.01)
*H04N 5/247* (2006.01)

(52) U.S. Cl.
CPC .......... *H04N 7/181* (2013.01); *G08B 13/19656* (2013.01); *H04N 5/232* (2013.01); *H04N 5/247* (2013.01)
USPC ............. 348/143; 348/153; 348/24; 348/139; 348/211.11; 348/207.99

(58) Field of Classification Search
USPC .......... 348/143, 153, 24, 139, 211.11, 207.99
See application file for complete search history.

(56) References Cited

U.S. PATENT DOCUMENTS

| 2002/0118298 | A1* | 8/2002 | Bergen et al. .................. 348/565 |
| 2004/0041911 | A1* | 3/2004 | Odagiri et al. ............. 348/207.1 |
| 2005/0078183 | A1 | 4/2005 | Yoshimura et al. |
| 2007/0052804 | A1 | 3/2007 | Money et al. |
| 2007/0285270 | A1 | 12/2007 | Gunn et al. |
| 2008/0010028 | A1* | 1/2008 | Mazon et al. .................... 702/30 |
| 2009/0207046 | A1* | 8/2009 | Arrighetti ..................... 340/937 |

FOREIGN PATENT DOCUMENTS

| DE | 69930694 | 9/2006 |
| JP | 09252466 | 9/1997 |
| JP | 09294257 | 11/1997 |
| JP | 2001/268399 | 9/2001 |
| JP | 2004137035 | 5/2004 |
| JP | 2006037605 | 2/2006 |
| WO | 02/093926 | 11/2002 |

(Continued)

OTHER PUBLICATIONS

ISA German Patent and Trademark Office, Search Report of 20 2008 009 834.3, Mar. 17, 2009, Germany, 4 pages.

(Continued)

*Primary Examiner* — Lan-Dai T Truong
(74) *Attorney, Agent, or Firm* — Alleman Hall McCoy Russell & Tuttle LLP

(57) ABSTRACT

The present disclosure relates to a camera for use in a digital network, in particular as a surveillance camera in a working device, including an integrated router having at least two ports for communication with further network components, in particular having a first port for communication with a terminal and having a second port for communication with a further camera.

16 Claims, 1 Drawing Sheet

(56) References Cited

FOREIGN PATENT DOCUMENTS

| | | |
|---|---|---|
| WO | 2006/086307 | 8/2006 |
| WO | 2006/136922 | 12/2006 |

OTHER PUBLICATIONS

ISA European Patent Office, Search Report of EP 09 00 8935, Sep. 18, 2009, Germany, 3 pages.

\* cited by examiner

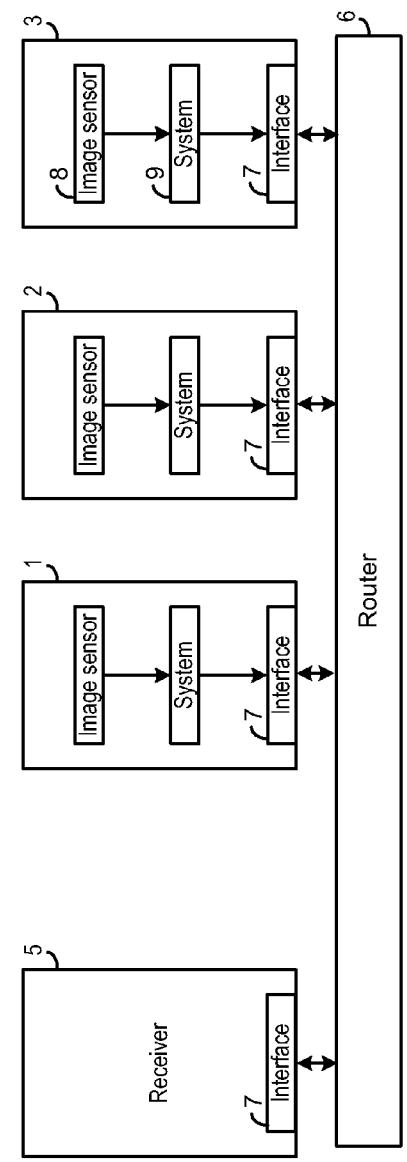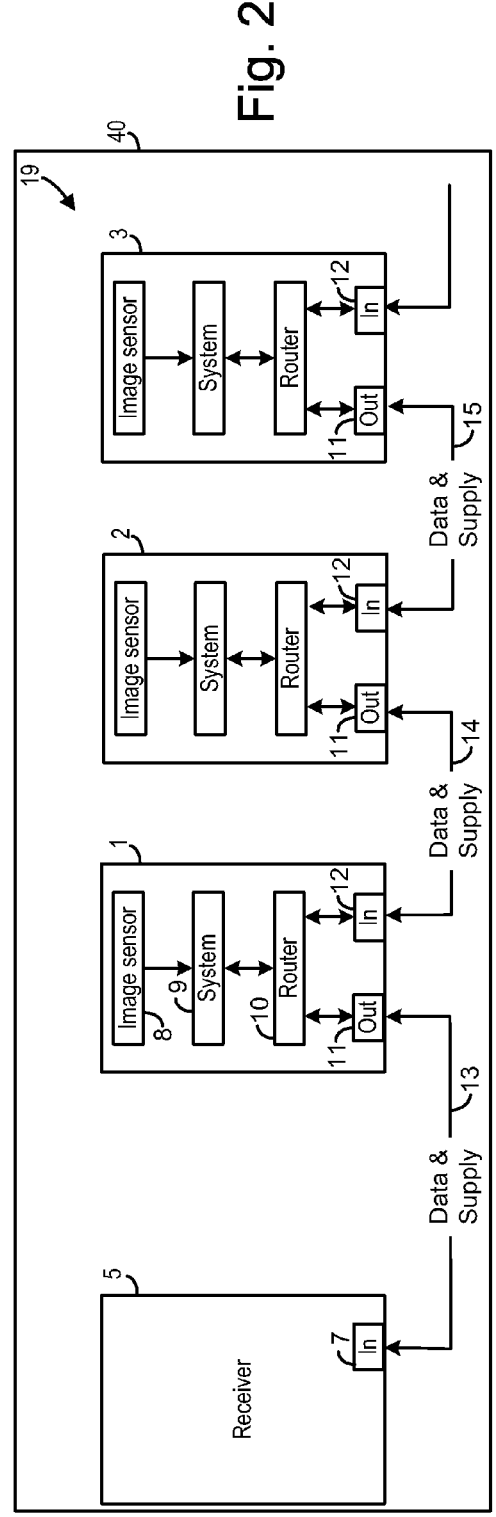

CAMERA FOR USE IN A DIGITAL NETWORK

CROSS REFERENCE TO RELATED APPLICATION

This application claims priority to German Utility Model Application No. 20 2008 009 834.3, filed Jul. 22, 2008, which is hereby incorporated by reference in its entirety for all purposes.

FIELD

The present disclosure relates to a camera for use in a digital network, in particular as a surveillance camera in a working device.

BACKGROUND

In modern working devices, networks such as Ethernet, CAN, RS232 or Flexray are frequently present for the exchange of digital data. If a camera should be used in such working devices, e.g. to monitor a region, the existing digital network can be used to transfer the image data from the camera to a terminal on which they are displayed.

A router or a switch is used in known cameras for a connection of a plurality of cameras to a terminal or for the use of one camera with a plurality of terminals. FIG. 1 shows such a known connection of a plurality of cameras 1 to 3 to a terminal 5 via the router 6. The router 6 in this respect has one router port per camera to which a respective port 7 of the cameras 1 to 3 is connected via a connection cable. The router furthermore has a port for the terminal 5 to which the port 7 of the terminal is connected via a connection cable. A cable must therefore in each case be laid from the terminal 5 and from the cameras 1 to 3 to the router 6. This results in high cable costs and a high wiring effort with large distances. In addition, it is difficult to retrofit further cameras with such systems.

SUMMARY

It is therefore the object of the present disclosure to provide a camera for use in a digital network which allows a simplified connection of a plurality of cameras to one terminal or of one camera to a plurality of terminals.

This object is satisfied by a camera for use in a digital network, in particular as a surveillance camera in a working device, including an integrated router with at least two ports for communication with further network components. These further network components are in particular terminals and/or further cameras. In accordance with the present disclosure, the function of the router is therefore integrated into the camera so that the camera in accordance with the present disclosure can be used as a router for further network components, in particular for further cameras. A plurality of cameras can hereby be used at one terminal without having to use a separate router and wiring it to all components of the system. Equally, a plurality of terminals can be used with one camera without having to make use of a separate router.

In this respect, a plurality of network components can be daisy chained by the integrated router of the camera in accordance with the present disclosure having two ports, with the camera in accordance with the present disclosure forming a member of this chain and enabling the communication between two network components connected to the ports. The camera in accordance with the present disclosure in this respect advantageously has a first port for communication with a terminal and a second port for communication with a further camera. The communication with the terminal in this respect does not necessarily have to be direct, but can rather also take place indirectly e.g. via an interposed further camera. A plurality of cameras can hereby be connected to the terminal in the form of a chain without each individual camera having to be connected to a central router via a separate cable.

The present disclosure thus enables the use of a plurality of components without any additional wiring effort. In addition, the space requirement for a separate router as well as the substantial costs for a router as a stand-alone solution are omitted. The integration of the router in the camera is thus an ideal solution for industrial applications. For this purpose, only the two ports and the corresponding support of the functionality in the hardware design or software design have to be provided at the camera.

The basic idea is thus that each camera generally has at least one data input and one data output. In this respect, the camera can advantageously receive image data from at least one further camera via the second port and can forward them to a terminal together with its own image data via the first port. The first camera hereby serves as a router for the data of the further camera and, on the daisychaining of further cameras, of all further cameras in the chain.

The two ports of the camera in accordance with the present disclosure, however, advantageously represent bidirectional communication interfaces, with the camera advantageously being able to receive control and/or configuration data from the terminal and/or to forward them to the further camera. The data exchange thus takes place bidirectionally via both ports so that the input for the reception of the image data from the further camera simultaneously serves as the output for the control and/or configuration data and the output for the transmission of the image data to the terminal simultaneously serves as the input for control and/or configuration data. Depending on the realization, the two ports of the camera can therefore be made physically identical. It is e.g. possible by the bidirectional communication to switch the camera or further cameras on or off or to fix further functions of the cameras such as the frame rate or the compression factors.

The camera accordingly receives control and/or configuration data from the terminal via the first port and can forward them to further downstream parts by means of the router. In addition, the camera forwards both its own image data and the received image data to the receiver via the first port. The camera forwards control and configuration data to a further camera and receives image data from it for forwarding via the second port. The communication of the camera with the terminal can in this respect take place respectively directly or via a camera connected upstream in the chain.

The camera can in this respect advantageously be connected to the terminal via one or more further cameras and/or two or more further cameras can be connected to the camera so that three or more cameras can be connected to one another in the form of a chain. The camera in accordance with the invention can accordingly advantageously be connected to the terminal via an interposed camera into which a router is likewise integrated or can connect at least one further camera with an integrated router to the terminal. Each camera thus simultaneously serves as a router for the cameras downstream in the chain. The system can thus be daisychained as desired, with the transmission bandwidth naturally being divided accordingly.

The power supply of the camera further advantageously also takes place via the ports. In this respect, the power supply of the camera, in particular advantageously takes place via the first port and is forwarded to the further camera via the second port. Since the supply voltage is passed on via the ports, no additional supply lines are required.

The present disclosure in this respect furthermore includes a camera system having two or more cameras which are advantageously connectable or connected to one another in the form of a chain. The individual cameras of the camera system can in this respect be identical cameras. It is, however, also conceivable to use different cameras into which, however, respective routers are integrated so that the daisychaining in accordance with the present disclosure becomes possible.

The present disclosure furthermore includes a visualization system having at least one camera such as has been illustrated above and having a terminal which advantageously has a display unit for the display of the image data delivered by the cameras. Such a visualization system can be integrated into working devices without any great cabling effort due to the router integrated in the camera. The retrofitting of such a system with further cameras is equally simplified.

The terminal in this respect advantageously has a port for the communication with further network components, with cameras being connectable or connected to the terminal in the form of a chain via the port.

The present disclosure further includes a working device, in particular a movable working device, having at least one camera, and advantageously at least two cameras, as have been described above. The present disclosure furthermore includes a working device, in particular a movable working device, having a visualization system such as has been described above. The particularly advantageous use of the camera in accordance with the present disclosure or of the visualization system in accordance with the present disclosure in a working device has already been explained.

The camera or cameras is/are in this respect advantageously used with a movable working device of the present disclosure for monitoring of the rear space. In this respect, the present disclosure reduces the number of required network components as well as the cabling when more than one camera or more than one terminal are needed.

BRIEF DESCRIPTION OF THE FIGURES

The present disclosure will now be presented in more detail with reference to an embodiment and to a drawing. There are shown FIG. 1 shows a visualization system in accordance with the prior art; and FIG. 2 shows an embodiment of a visualization system in accordance with the present disclosure in which the embodiment of a camera in accordance with the present disclosure is used.

DETAILED DESCRIPTION

In the visualization system 19 shown in FIG. 2, cameras 1 to 3 in accordance with the present disclosure are used in which a respective router 10 is integrated. The integrated router 10 in this respect takes over the data exchange between the components of the network, for which purpose it has ports 11 and 12 via which the camera is in communication with further network components. The router 10 of each camera in this respect takes over the communication with the other cameras as well as with a terminal 5 in the shown embodiment of the visualization system. Furthermore, the routers 10 are each in communication via the internal connection 20 with the system 9 of the respective camera which provides the camera functions together with the image sensor 8. The router 10 integrated into the cameras 1 to 3 in this respect receives data packets and transmits them to the ports 11 or 12 in dependence on the address or via the internal connection 20 to the separate system 9.

A plurality of cameras can hereby be connected to the terminal 5 in the form of a chain without each individual camera having to be connected to a common, or central, router 6 via a separate cable. In this respect, each camera has a first port 11 for the communication with the terminal 5 and a second port 12 for the communication with a further camera. The communication with the terminal 5 can in this respect also take place via interposed cameras. The communication of the camera 2 with the terminal thus initially takes place via the port 11 with port 12 of the camera 1 and then further via the port 11 of the camera 1 with port 7 of the terminal 5. In this respect, the camera 1 can receive image data from the camera 2 and forward them to the terminal 5. Data of the camera 3 are forwarded to the terminal 5 via the camera 2 and the camera 1. For this purpose, only one connection line 13 is required between the terminal 5 and the camera 1, one further connection line 14 between the camera 1 and the camera 2 and a further connection line 15 between the camera 2 and the camera 3. Equally, a further camera can be connected to camera 3. A direct connection of all cameras to a central router is, in contrast, no longer necessary. The cabling is hereby substantially simplified.

The ports 11 and 12 of the cameras 1 to 3 as well as the port 7 of the terminal 5 in this respect represent bidirectional communication interfaces. In this respect, the distinction between the input and the output in the ports 11 and 12 is only relevant in the sense of the daisychain representation in FIG. 2. The data exchange in this respect takes place bidirectionally to be able to transmit configuration and control data in the opposite direction to the image data transmission. It is hereby possible e.g. to switch one of the cameras on or off, to fix the frame rate or the compression factors or to control further functions of the cameras. The camera accordingly forwards both its own image data and received image data to the receiver and simultaneously receives control and configuration data via the port 11. The camera receives image data and forwards control and configuration data via the port 12. Furthermore, the supply voltage is also passed on via the ports so that no additional supply lines are required.

In accordance with the invention, the system can be daisychained as desired, with the transmission bandwidth then naturally being shared by a plurality of cameras. However, with a sufficient transmission bandwidth, any desired number of cameras can be daisychained.

The visualization system in accordance with the invention in which the images taken by one or more cameras can be presented on the terminal 5 is in this respect particularly advantageously used with working machines for surveillance purposes, in particular with movable working machines such as construction plant for rear space monitoring. The use is equally associated with considerable advantages with cranes, in particular with mobile cranes. Further application possibilities are agricultural vehicles, commercial vehicles, maritime applications and site security. Element 40 may represent any of the various working machines, mobile cranes, vehicles, etc.

With working devices, in particular with construction plant or cranes, it can be assumed that, due to their size, two or more cameras will have to be used for the rear space monitoring which are in this respect usually mounted very close to one another, but far away from the terminal 5. Since, in accordance with the invention, the image of the second camera and of every further camera is forwarded via the first camera, only a short cable is required in each case between the individual cameras. Only the first camera then has to be connected to the terminal 5 via a longer cable.

A saving of some meters of cable hereby already results with construction plant. With crane booms in which the cameras are then advantageously used as working cameras for the observation of the load or of the lifting point, cable lengths of up to several hundred meters can even be saved.

There is also the advantage of corresponding flexibility with respect to the savings potential of the cabling since only one port is always needed at the terminal 5, e.g. the central control, and nevertheless as many cameras as desired can be used. The subsequent attachment of further cameras is in this respect likewise considerably simpler since the total cable duct no longer has to be opened. In addition, no additional router has to be used which can only be integrated at the working device with difficulty, in particular with subsequently applied solutions.

A possibility which is as cost-effective as it is comfortable thus results from the present invention to connect a plurality of cameras to one terminal or a plurality of terminals to one camera.

The invention claimed is:

1. A camera for use in a digital network comprising:
   an integrated router having at least two ports for communication with further network components, wherein the integrated router receives data packets and transmits the data packets to a selected port of the at least two ports in dependence on an address;
   wherein in the digital network , comprising:
   a movable working device;
   a visualization system coupled in the movable working device, the visualization system including a first digitally networked surveillance camera and a second digitally networked surveillance camera, each of the first and second cameras including an integrated router and having at least two communication ports, wherein the integrated router receives data packets and transmits the data packets to a selected port of the at least two ports in dependence on an address;
   a terminal coupled to the first port of the first camera, wherein the first port of the second camera is coupled to the second port of the first camera, and the second port of the second camera is coupled to an additional network component; wherein the second camera is digitally networked to the terminal via the first camera, and
   wherein at least one of the cameras is positioned for rear space monitoring of the movable working device.

2. The camera in accordance with claim 1, wherein the camera is a surveillance camera.

3. The camera in accordance with claim 2, wherein the first port is for communication with a terminal and the second port is for communication with at least one further camera.

4. The camera in accordance with claim 2, wherein the further network components connected to the camera are in communication with one another via the router.

5. The camera in accordance with claim 3, wherein the camera receives image data from the at least one further camera via the second port and forwards the image data to the terminal together with its own image data via the first port.

6. The camera in accordance with claim 3, wherein the two ports represent bidirectional communication interfaces, with the camera configured to receive control and/or configuration data from the terminal and/or to forward control and/or configuration data to the at least one further camera.

7. The camera in accordance with claim 3, wherein a power supply takes place via the ports so that the power supply of the camera takes place via the first port and is forwarded to the further camera via the second port.

8. The camera in accordance with claim 3, wherein the camera is connected to the terminal via one or more further cameras and/or two or more further cameras are connected to the camera so that three or more cameras are connected to one another in the form of a chain without being connected by a common router.

9. the camera in accordance with claim 1 further includes a camera system having two or more cameras which are connectable or connected to one another in the form of a chain.

10. the camera in accordance with claim 1 further includes a visualization system comprising at least one camera and a terminal which includes a display unit for the display of image data delivered by the at least one camera.

11. The visualization system in accordance with claim 10, wherein the terminal has a port for communication with further network components, with further cameras being connectable or connected to the terminal in the form of a chain via the port.

12. the visualization system in accordance with claim 10 comprises a working device.

13. the camera in accordance with claim 1 further includes a working device, having at least one camera.

14. The working device of claim 13, wherein the working device is a movable working device.

15. A system, comprising:
   a movable working device;
   a visualization system coupled in the movable working device, the visualization system including a first digitally networked surveillance camera and a second digitally networked surveillance camera, each of the first and second cameras including an integrated router and having at least two communication ports, wherein the integrated router receives data packets and transmits the data packets to a selected port of the at least two ports in dependence on an address;
   a terminal coupled to the first port of the first camera, wherein the first port of the second camera is coupled to the second port of the first camera, and the second port of the second camera is coupled to an additional network component; wherein the second camera is digitally networked to the terminal via the first camera, and
   wherein at least one of the cameras is positioned for rear space monitoring of the movable working device.

16. The system of claim 15, wherein each of the first and second cameras are not connected by a common router.

* * * * *

UNITED STATES PATENT AND TRADEMARK OFFICE
CERTIFICATE OF CORRECTION

PATENT NO.        : 8,976,243 B2                               Page 1 of 1
APPLICATION NO.   : 12/504252
DATED             : March 10, 2015
INVENTOR(S)       : Volker Marquart and Marcel Brasch It is certified that error appears in the above-identified patent and that said Letters Patent is hereby corrected as shown below:

In the Claims,

In Claim 9:
In Column 6 at line 19, capitalize the "t" in the word "the".

In Claim 10:
In Column 6 at line 22, capitalize the "t" in the word "the".

In Claim 12:
In Column 6 at line 31, capitalize the "t" in the word "the".

In Claim 13:
In Column 6 at line 33, capitalize the "t" in the word "the".

Signed and Sealed this
Thirtieth Day of June, 2015

Michelle K. Lee
*Director of the United States Patent and Trademark Office*